(12) United States Patent
Zhang et al.

(10) Patent No.: US 12,359,567 B2
(45) Date of Patent: Jul. 15, 2025

(54) BLAST HOLE ARRANGEMENT STRUCTURE USED FOR BLASTING FOR RHEOLOGICAL SOFT-WEAK SURROUNDING ROCK TUNNEL AND CONSTRUCTION METHOD FOR RHEOLOGICAL SOFT-WEAK SURROUNDING ROCK TUNNEL

(71) Applicant: CHINA RAILWAY 18 BUREAU GROUP CO. LTD., Tianjin (CN)

(72) Inventors: Xin Zhang, Tianjin (CN); Jinshan Sun, Tianjin (CN); Xiangping Zhang, Tianjin (CN); Daqi Hu, Tianjin (CN)

(73) Assignee: CHINA RAILWAY 18 BUREAU GROUP CO. LTD., Tianjian (CN)

( * ) Notice: Subject to any disclaimer, the term of this patent is extended or adjusted under 35 U.S.C. 154(b) by 514 days.

(21) Appl. No.: 17/964,005

(22) Filed: Oct. 11, 2022

(65) Prior Publication Data
US 2024/0102385 A1 Mar. 28, 2024

(30) Foreign Application Priority Data

Sep. 22, 2022 (CN) .......................... 202211159671.3

(51) Int. Cl.
*F42D 3/04* (2006.01)
*E21D 9/00* (2006.01)

(52) U.S. Cl.
CPC ............... *E21D 9/006* (2013.01); *F42D 3/04* (2013.01)

(58) Field of Classification Search
CPC .................................. E21D 9/006; F42D 3/04
See application file for complete search history.

(56) References Cited

PUBLICATIONS

CN 109341450 (Year: 2019).*
CN 114353608 (Year: 2022).*

* cited by examiner

*Primary Examiner* — Sunil Singh
(74) *Attorney, Agent, or Firm* — SZDC Law PC

(57) ABSTRACT

A tunnel section subjected to grouting reinforcement is divided into two parts, that is, an upper half section and a lower half section, cutting vibration reduction holes used in coordination with cutting holes are formed in the upper half section, and the cutting vibration reduction holes are not charged and are filled with water bags only. According to the blast hole arrangement structure used for blasting for the rheological soft-weak surrounding rock tunnel of the invention, a cutting blasting effect is improved, excess energy is emptied and absorbed, propagation of shock waves and stress waves around is reduced, and vibration is reduced; and according to the invention, the purpose of forming vibration isolation holes in a tunnel excavation contour line of the upper half section is to prevent, absorb, reflect and refract the propagation of the blasting shock waves, stress waves and seismic waves.

16 Claims, 6 Drawing Sheets

BLAST HOLE ARRANGEMENT STRUCTURE USED FOR BLASTING FOR RHEOLOGICAL SOFT-WEAK SURROUNDING ROCK TUNNEL AND CONSTRUCTION METHOD FOR RHEOLOGICAL SOFT-WEAK SURROUNDING ROCK TUNNEL

This application claims priority to Chinese Patent Application No. 202211159671.3, filed on Sep. 22, 2022, which is incorporated by reference for all purposes as if fully set forth herein.

TECHNICAL FIELD

The invention relates to the technical field of tunnel construction blasting, and in particular to a blast hole arrangement structure used for blasting for a rheological soft-weak surrounding rock tunnel and a construction method for the rheological soft-weak surrounding rock tunnel.

BACKGROUND

Soft-weak surrounding rock generally refers to surrounding rock with soft-weak rock, low bearing capacity, developed joints and fissures, and broken structure, where rheological soft-weak surrounding rock refers to soft rock (similar to flowing mud) with media which are mainly rheological, and the rheological property is also known as viscosity. The rheological property of the soft rock includes elastic aftereffect, flowing, closure of structural surfaces, and slip deformation. The rheological property is mainly manifested in creep property and relaxation property of the soft rock, and attenuation property of flowing limit of the soft rock.

The surrounding rock tunnel can be excavated carefully only under the safety condition that curtain grouting reinforcement guarantees no collapse, no wall caving, no floor heave, no mud gushing, and no water permeation, and with an emergency plan at the same time. However, after grouting reinforcement, manual excavation and mechanical excavation can not be carried out in most cases, and a careful loose blasting method can only be adopted; however, vibration is difficultly controlled when the loose blasting method is adopted, potential safety hazards such as wall caving and collapse occur after blasting, and moreover, the blasting footage is small and the construction progress is slow.

SUMMARY

The invention provides a blast hole arrangement structure used for blasting for a rheological soft-weak surrounding rock tunnel. A tunnel section subjected to grouting reinforcement is divided into two parts, that is, an upper half section and a lower half section, cutting vibration reduction holes used in coordination with cutting holes are formed in the upper half section, and the cutting vibration reduction holes are not charged and are filled with water bags only.

On the basis of the above solution, a plurality of first-layer vibration isolation holes are formed in a tunnel excavation contour line of the upper half section, and the first-layer vibration isolation holes are filled with soft mud.

On the basis of the above solution, a plurality of second-layer vibration isolation holes are formed in one side, close to the lower half section, of the first-layer vibration isolation holes, and the second-layer vibration isolation holes are filled with soft mud.

On the basis of the above solution, the upper half section is divided into a middle area, a left heading area and a right heading area which are used for separate divisional blasting; and the cutting holes and the cutting vibration reduction holes used in coordination with the cutting holes are respectively formed in the middle area, the left heading area and the right heading area.

On the basis of the above solution, a plurality of side vibration isolation holes are formed in the junction of the middle area and the left heading area and in the junction of the middle area and the right heading area, and the side vibration isolation holes are empty holes and are not filled inside.

On the basis of the above solution, the middle area is provided with a row of cutting holes vertically in both sides of the center line of the tunnel, and a row of cutting vibration reduction holes is formed vertically in the both sides of the center line of the tunnel and between the two rows of cutting holes.

On the basis of the above solution, a charging manner for the cutting holes in the middle area is that the adjacent cutting holes are charged at intervals in a manner of 3 rolls to 2 rolls to the bottoms of the holes, and the remainders of the blast holes are filled with stemming.

According to the blast hole arrangement structure used for blasting for the rheological soft-weak surrounding rock tunnel of the invention, a cutting vibration reduction hole filled with a water bag is provided at a place next to each cutting hole, so that a cutting blasting effect is improved, and moreover, excess energy is emptied and absorbed, propagation of shock waves and stress waves around is reduced, and vibration is reduced; and according to the invention, the plurality of first-layer vibration isolation holes are formed in a tunnel excavation contour line of the upper half section, second-layer vibration isolation holes are formed within the tunnel excavation contour line (referring to one side, close to the tunnel section, of an outer contour line of the tunnel); the vibration isolation holes are filled with soft mud; and the purpose is to prevent, absorb, reflect and refract the propagation of the blasting shock waves, stress waves and seismic waves. On the one hand, rock between every two holes is broken by tensile stress due to reflection and refraction of different interfaces and different media; on the other hand, part of excess parameters are emptied, the vibration is reduced, and stress is prevented from continuing to propagate outside the excavation contour line, so that a loose circle of blasting is controlled, a grouting effect outside an excavation boundary is protected from damage, and collapse after excavation is prevented. According to the invention, side vibration isolation holes are formed in the junction of the middle area and the left heading area and in the junction of the middle area and the right heading area of the upper half section, and the purpose is to effectively prevent, absorb, reflect and refract the propagation of the blasting shock waves, stress waves and seismic waves, prevent or reduce vibration and damage to a primary support, and prevent instability of the primary support. According to the blast hole arrangement structure and the blasting method of the invention, loose rock breaking is realized for whole section blasting, the throwing distance is very small, and the primary support is protected from collapse. The technical solution of the invention is applicable to construction for various tunnels and chambers in highways, railways, mines, subways and other similar stratum geologies (rheological soft-weak surrounding rocks).

DETAILED DESCRIPTION OF THE EMBODIMENTS

The present invention will be further elaborated with reference to the following drawings and embodiments. It is to be pointed out that the following embodiments are intended to facilitate the understanding of the present invention, but have no limiting effect thereon.

Embodiment 1

A blast hole arrangement structure used for blasting for a rheological soft-weak surrounding rock tunnel, where a tunnel section subjected to grouting reinforcement is divided into two parts, that is, an upper half section 1 and a lower half section 2, cutting vibration reduction holes 1-2 used in coordination with cutting holes 1-1 are formed in the upper half section 1, and the cutting vibration reduction holes 1-2 are not charged and are filled with water bags only. During construction, the upper half section 1 is constructed at first, and then the lower half section 2 is constructed.

Since the charging quantity of simultaneous blasting of the cutting holes 1-1 is the largest, after detonating, a detonator drives explosive to complete blasting in a very short time, a large amount of gas is generated and a large amount of heat energy is released, the high-temperature and high-pressure gas breaks surrounding rocks and generates shock waves in media, part of the energy continues to break the rocks for work, and part of the energy is converted into stress waves and then converted into seismic waves. When each cutting hole is equipped with a cutting vibration reduction hole filled with a water bag, a free surface is added to help the cutting hole to break the rocks as much as possible, the excess energy may be emptied and absorbed, and the propagation of the shock waves and stress waves around is reduced.

Figure 4:
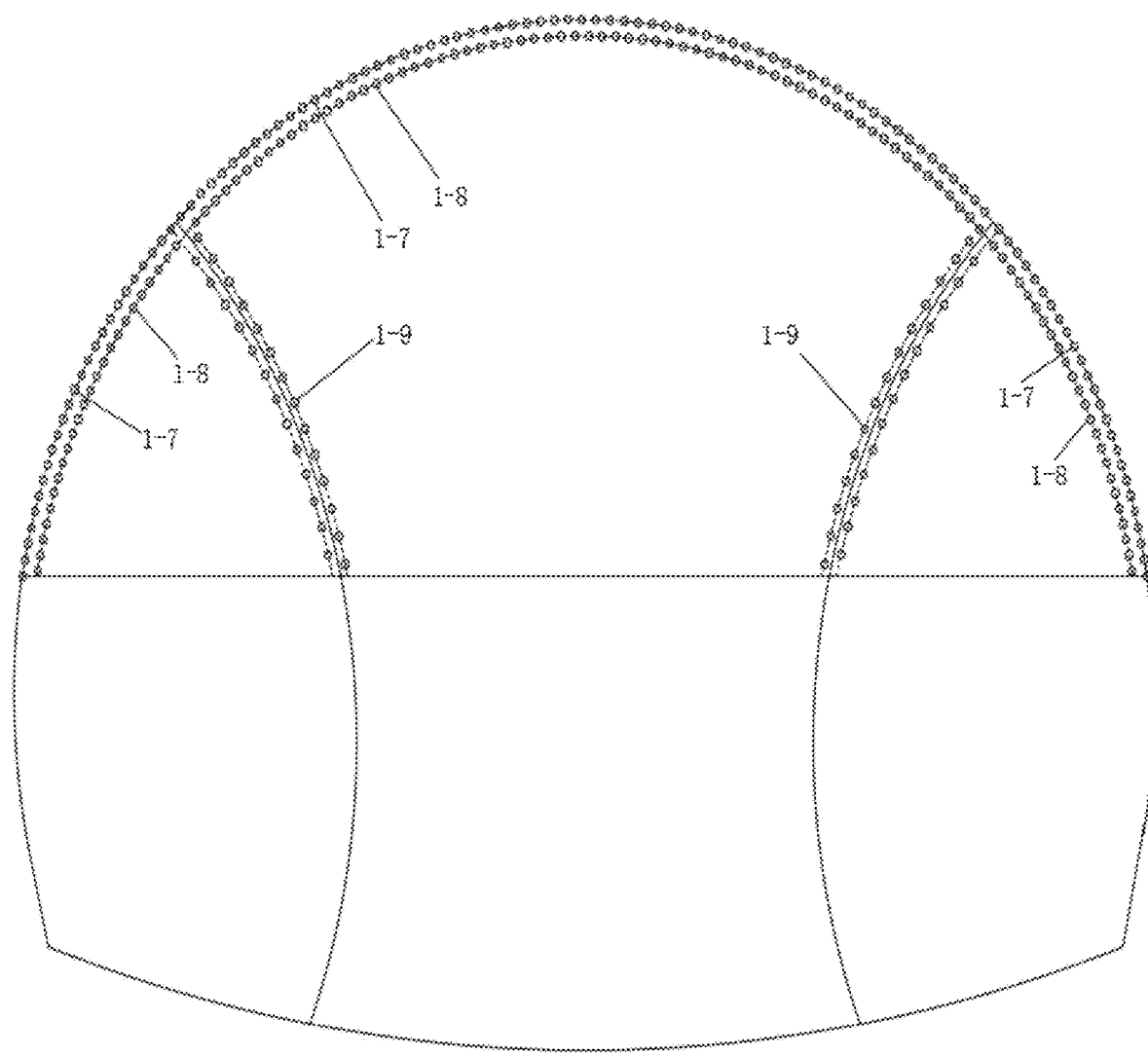
FIG. 4 is a schematic diagram of vibration isolation holes formed in the upper half section of the tunnel in the example 1.

On the basis of the above technical solution, as shown in FIG. 4, according to the invention, a plurality of first-layer vibration isolation holes 1-7 are formed in a tunnel excavation contour line of the upper half section, second-layer vibration isolation holes 1-8 are formed within the tunnel excavation contour line (referring to one side, close to the tunnel section, of an outer contour line of the tunnel); and the first-layer vibration isolation holes 1-7 and the second-layer vibration isolation holes 1-8 are filled with soft mud. According to the invention, the purpose of forming the two layers of vibration isolation holes (the first-layer vibration isolation holes 1-7 and the second-layer vibration isolation holes 1-8) in and near the tunnel excavation contour line is to prevent, absorb, reflect and refract the propagation of the blasting shock waves, stress waves and seismic waves. On the one hand, the rock between every two holes is broken by tensile stress due to reflection and refraction of different interfaces and different media; on the other hand, part of excess parameters are emptied, the vibration is reduced, and stress is prevented from continuing to propagate outside the excavation contour line, so that a loose circle of blasting is controlled, a grouting effect outside an excavation boundary is protected from damage, and collapse after excavation is prevented.

After the upper half section 1 is excavated in a blasting manner, a lot of machines pass through a slope of the lower half section 2 during muck removal, primary support and other steps, so that a rock mass of the lower half section 2 is disturbed for many times, and therefore, the lower half section 2 may generally be excavated by adopting manual pneumatic picks; if hardness of local parts of the lower half section 2 is large, hard blocks are chiseled away by using a breaking hammer, and then excavation is carried out by using an excavator; if the hardness of the lower half section 2 is too large, blasting may be carried out in a manner of conventional loose blasting, since the upper half section 1 is constructed, and the lower half section 2 is provided with vertical and horizontal free surfaces, the blasting effect is great; and therefore, the construction for the lower half section 2 will not be described too much in the present application.

Figure 1:
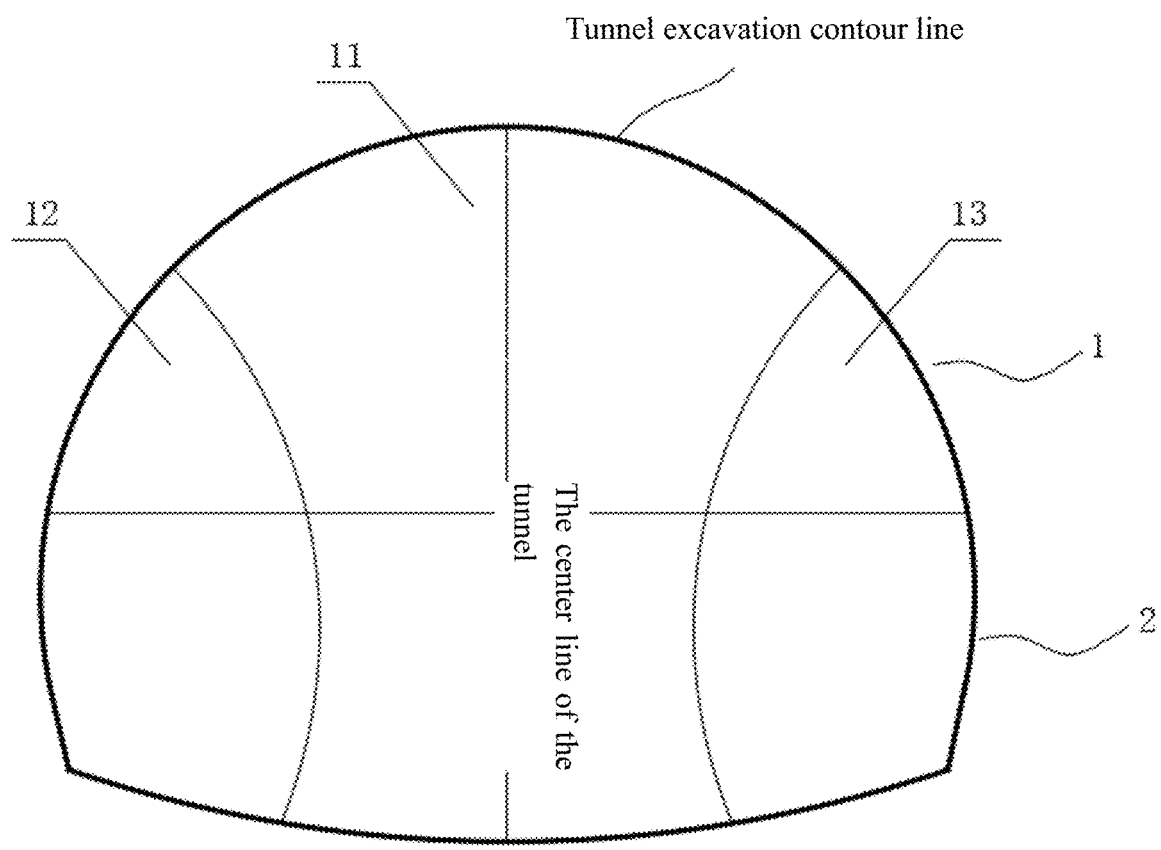
FIG. 1 is a schematic diagram of division of a tunnel section in the example 1.

As a specific solution for arrangement of the cutting holes 1-1 and the cutting vibration reduction holes 1-2 during blasting on the upper half section 1, as shown in FIG. 1, as a specific implementation solution, the upper half section 1 is divided into a middle area 11, a left heading area 12 and a right heading area 13, separate blasting construction is respectively carried out in the three areas, and the construction sequence is from the left heading area 12 to the middle area 11 and then to the right heading area 13. The cutting holes 1-1 and the cutting vibration reduction holes (1-2) used in coordination with the cutting holes 1-1 are respectively formed in the middle area 11, the left heading area 12 and the right heading area 13.

In order to reduce disturbance to the rock mass during separate blasting in the three areas, as shown in FIG. 4, a plurality of side vibration isolation holes 1-9 are formed in the junction of the middle area 11 and the left heading area 12 and in the junction of the middle area 11 and the right heading area 13, and the side vibration isolation holes 1-9 are empty holes and are not filled inside, that is, the side vibration isolation holes are used as empty holes and are not filled any material inside. As a specific solution, the middle area 11 is respectively provided with a row of side vibration isolation holes 1-9 in the junctions with the left heading area 12 and the right heading area 13; the left heading area 12 and the right heading area 13 are respectively provided with a row of side vibration isolation holes 1-9 in the junctions with the middle area 11; and the hole depth of the side vibration isolation holes 1-9 is smaller than that of the first-layer vibration isolation holes 1-7 and the second-layer vibration isolation holes 1-8, and is larger than that of the other blast holes. The function of forming the side vibration isolation holes is mainly to prevent, absorb, reflect and refract the propagation of the blasting shock waves, stress waves and seismic waves, prevent or reduce vibration and damage to a primary support, and prevent instability of the primary support, which is very important for the blasting construction for the rheological soft-weak surrounding rock targeted by the invention.

Specifically, the hole depth of the first-layer vibration isolation holes 1-7 and the second-layer vibration isolation holes 1-8 is larger than that of all the blast holes. The specific quantity can be referred to in FIG. 5.

Figure 2:
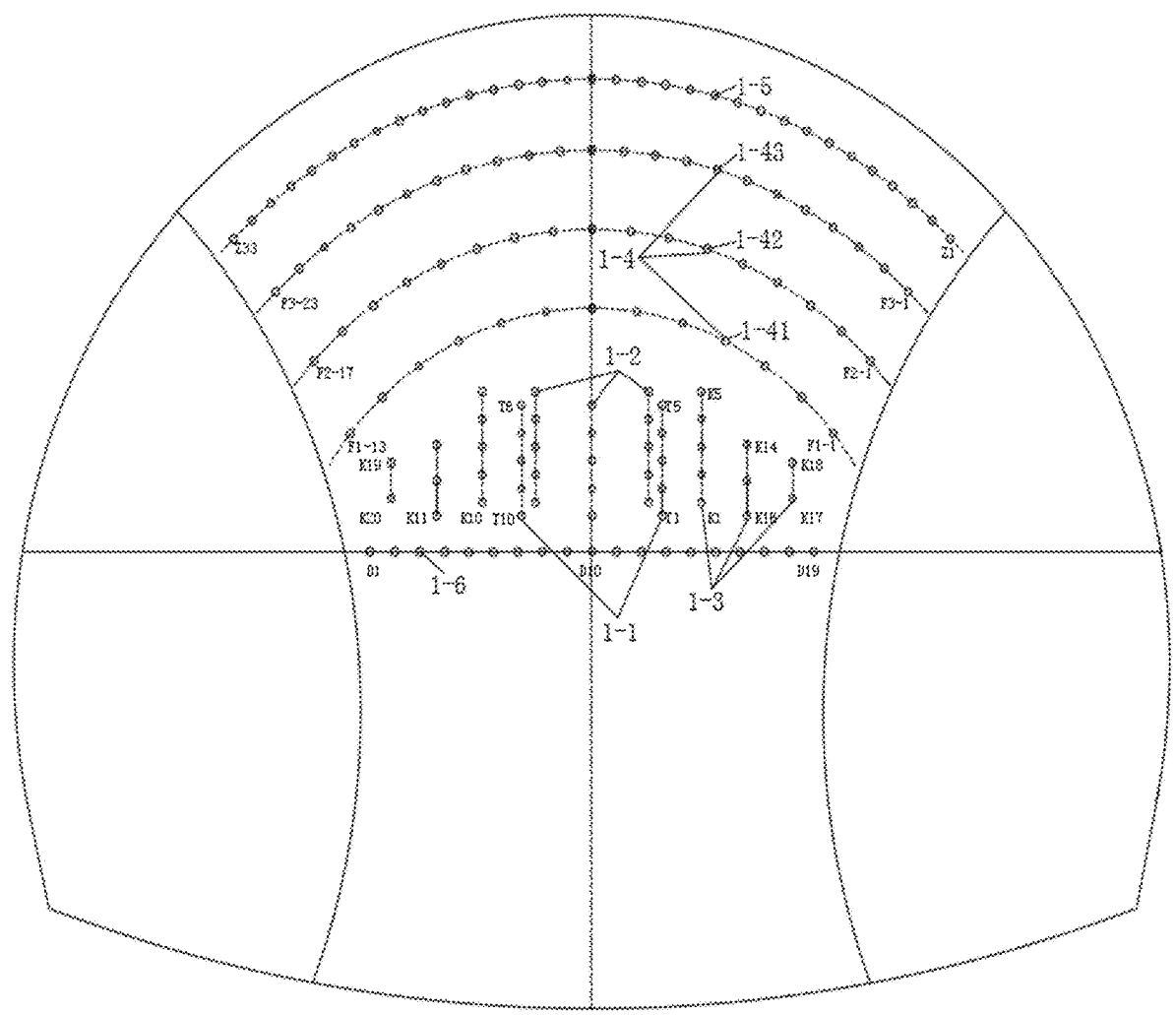
FIG. 2 is a schematic diagram of formation of blast holes of a middle area of an upper half section of a tunnel in the example 1 in the tunnel section.

In the above technical solution, an overall solution for the blast hole arrangement structure used for the blasting for the rheological soft-weak surrounding rock tunnel is already given, that is, the cutting holes are coordinated with the cutting vibration reduction holes and the vibration isolation holes, a good blasting effect is realized, and excessive interference to the rock mass is avoided. As a specific implementation solution, as shown in FIG. 2, a row of cutting holes 1-1 is respectively formed vertically in both sides of the center line of the tunnel, in the middle area 11, and the numbers of the two rows of cutting holes 1-1 are the same; and a row of cutting vibration reduction holes 1-2 is respectively formed vertically in the both sides of the center line of the tunnel and between the two rows of cutting holes 1-1. Specifically, the number of the cutting holes 1-1 and the number of the cutting vibration reduction holes 1-2 in the same side are the same, that is, each cutting hole 1-1 is equipped with one cutting vibration reduction hole 1-2. The purpose of the arrangement is to help the cutting holes 1-1 to break the rocks during blasting, and is to minimize the propagation of the shock waves and stress waves around at the same time. As a more optimized solution, a row of cutting vibration reduction holes 1-2 is further formed in the center line of the tunnel and between the two rows of cutting vibration reduction holes 1-2, and the number of the cutting vibration reduction holes 1-2 may be the same as that of the cutting holes 1-1 located in one side of the center line of the tunnel. By adding the other row of cutting vibration reduction holes, firstly, a row of free surfaces is added, which is conducive to rock breaking; secondly, excess energy is emptied, and vibration is reduced; and thirdly, impedance is reduced, and a throwing distance of the blasted rocks is reduced. As a specific solution for charging in the cutting holes, the charging manner for the cutting holes 1-1 is that the adjacent cutting holes 1-1 are charged at intervals in a manner of 3 rolls to 2 rolls (charging with 3/2 rolls at intervals means that the charging quantity of the cutting holes 1-1 adjacent to the cutting holes 1-1 charged with 3 rolls is 2 rolls, or in other word, the charging quantity of the cutting holes 1-1 adjacent to the cutting holes 1-1 charged with 2 rolls is 3 rolls, taking FIG. 2 as an example, the charging quantities of T1 to T5 are 3 rolls, 2 rolls, 3 rolls, 2 rolls and 3 rolls or are 2 rolls, 3 rolls, 2 rolls, 3 rolls and 2 rolls), the cutting holes 1-1 are charged to the bottoms of the holes, and the blast holes with the remaining length are filled with stemming; and in the invention, according to the charging manner for the cutting holes, firstly, a one-time detonating charging quantity is reduced, that is, blasting vibration is reduced; and secondly, the vibration of every two adjacent blast holes is different, so that superposition of vibration peaks between the two adjacent blast holes is reduced, resonance is avoided, and at the same time, part of energy is counteracted, so that the vibration is minimized.

In addition to the cutting holes 1-1 and the cutting vibration reduction holes 1-2, reaming holes 1-3, auxiliary holes 1-4, peripheral holes 1-5 and bottom holes 1-6 are further formed in the middle area 11. As a specific implementation solution, a plurality of reaming holes 1-3 are respectively formed vertically in one side, away from the center line of the tunnel, of the cutting holes 1-1; and preferably, three rows of the reaming holes 1-3 are respectively formed in one side of the center line of the tunnel. The reaming holes 1-3 are charged at intervals in a manner of 2 rolls to 1 roll. (Charging at intervals in a manner of 2 rolls to 1 roll means that the charging quantity of the reaming holes adjacent to the reaming holes charged with 2 rolls is 1 roll, or in other word, the charging quantity of the reaming holes adjacent to the reaming holes charged with 1 roll is 2 rolls, taking FIG. 2 as an example, the charging quantities of K1 to K5 are 2 rolls, 1 roll, 2 rolls, 1 roll and 2 rolls or are 1 roll, 2 rolls, 1 roll, 2 rolls and 1 roll). The purpose of the charging manner for the reaming holes is also to reduce the blasting vibration, and reduce superposition of vibration peaks between every two adjacent blast holes, so that resonance is avoided, and at the same time, part of energy is counteracted, so that the vibration is minimized.

A plurality of auxiliary holes 1-4 are formed between the cutting holes 1-1 and the tunnel excavation contour line of the upper half section. Specifically, three layers of the auxiliary holes 1-4 are formed, and respectively are first-layer auxiliary holes 1-41, second-layer auxiliary holes 1-42 and third-layer auxiliary holes 1-43, and on the tunnel section, connection lines among the center points of the auxiliary holes in each layer are arc-shaped, which is specifically shown in FIG. 2. Specifically, the first-layer auxiliary holes 1-41 are charged with 1 roll separately; the second-layer auxiliary holes 1-42 are charged with 1 roll at intervals separately, (charging with 1 roll at intervals separately means charging with 1 roll every other auxiliary hole, taking FIG. 2 as an example, the charging quantities of F2-1 to F2-17 are 0 roll, 1 roll, 0 roll, 1 roll, 0 roll and so on or are 1 roll, 0 roll, 1 roll, 0 roll, 1 roll and so on); the manner of charging at intervals is adopted for the second-layer auxiliary holes, firstly, a free surface is added equivalently, which is conducive to rock breaking; and secondly, excess energy is emptied, blasting shock waves and stress waves are refracted and reflected, vibration is reduced, and a loose circle of surrounding rock is reduced, which is conducive to the stability of the surrounding rock after blasting. the third-layer auxiliary holes 1-43 are charged at intervals in a manner of 1 roll to 0.5 roll, (charging at intervals in a manner of 1 roll to 0.5 roll means that the charging quantity of the auxiliary holes adjacent to the auxiliary holes charged with 1 roll is 0.5 roll, or in other word, the charging quantity of the auxiliary holes adjacent to the auxiliary holes charged with 0.5 roll is 1 roll, taking FIG. 2 as an example, the charging quantities of F3-1 to F3-23 are 0.5 roll, 1 roll, 0.5 roll, 1 roll, 0.5 roll and so on or are 1 roll, 0.5 roll, 1 roll, 0.5 roll, 1 roll and so on).

A plurality of peripheral holes 1-5 are formed between the outermost-layer auxiliary holes 1-4 and the tunnel excavation contour line of the upper half section (or between the outermost-layer auxiliary holes 1-4 and the second layer of vibration isolation holes 1-8); the peripheral holes 1-5 are charged with 0.5 roll every other hole, and the openings of the charged peripheral holes are sealed with water stemming of 200 mm to 300 mm; and the uncharged peripheral holes 1-5 are fully filled with stemming.

A plurality of bottom holes 1-6 are formed in the junction of the middle area 11 and the lower half section 2, and the bottom holes 1-6 are charged at intervals in a manner of 2 rolls to 1 roll, (charging at intervals in a manner of 2 rolls to 1 roll means that the charging quantity of the bottom holes adjacent to the bottom holes charged with 2 rolls is 1 roll, or in other word, the charging quantity of the bottom holes adjacent to the bottom holes charged with 1 roll is 2 rolls, taking FIG. 2 as an example, the charging quantities of D1 to D19 are 2 rolls, 1 roll, 2 rolls, 1 roll, 2 rolls and so on or are 1 roll, 2 rolls, 1 roll, 2 rolls, 1 roll and so on).

Referring to Table 1 for the depths, inclination angles, detonating sequences and other blasting parameters of the cutting holes, the cutting vibration reduction holes, the reaming holes, the auxiliary holes, the peripheral holes, the bottom holes and the vibration isolation holes that are not described in detail in the embodiment, and the blasting parameters will not be described one by one here in detail.

On the basis of the blasting parameters in Table 1, the inclination angle between the first-layer vibration isolation holes 1-7 and a tunnel face, the inclination angle between the second-layer vibration isolation holes 1-8 and the tunnel face, and the inclination angle between the side vibration isolation holes 1-9 and the tunnel face are 90 degrees, the hole depth of the side vibration isolation holes 1-9 is 1.6 m, and the hole depth of the first-layer vibration isolation holes 1-7 and the hole depth of the second-layer vibration isolation holes 1-8 are 1.9 m.

a plurality of auxiliary holes 1-4 are formed in the periphery of the cutting holes 1-1, and a plurality of peripheral holes 1-5 are formed in the periphery of the auxiliary holes 1-4; and a row of bottom holes 1-6 is formed in the junction of the right heading area 13 and the lower half section 2.

The auxiliary holes 1-4 (as shown by F1 to F9 in FIG. 3) are charged at intervals in a manner of 2 rolls to 1 roll (charging at intervals in a manner of 2 rolls to 1 roll means that the charging quantity of the auxiliary holes adjacent to the auxiliary holes charged with 2 rolls is 1 roll, or in other word, the charging quantity of the auxiliary holes adjacent to the auxiliary holes charged with 1 roll is 2 rolls, taking FIG.

TABLE 1

Figure 5:
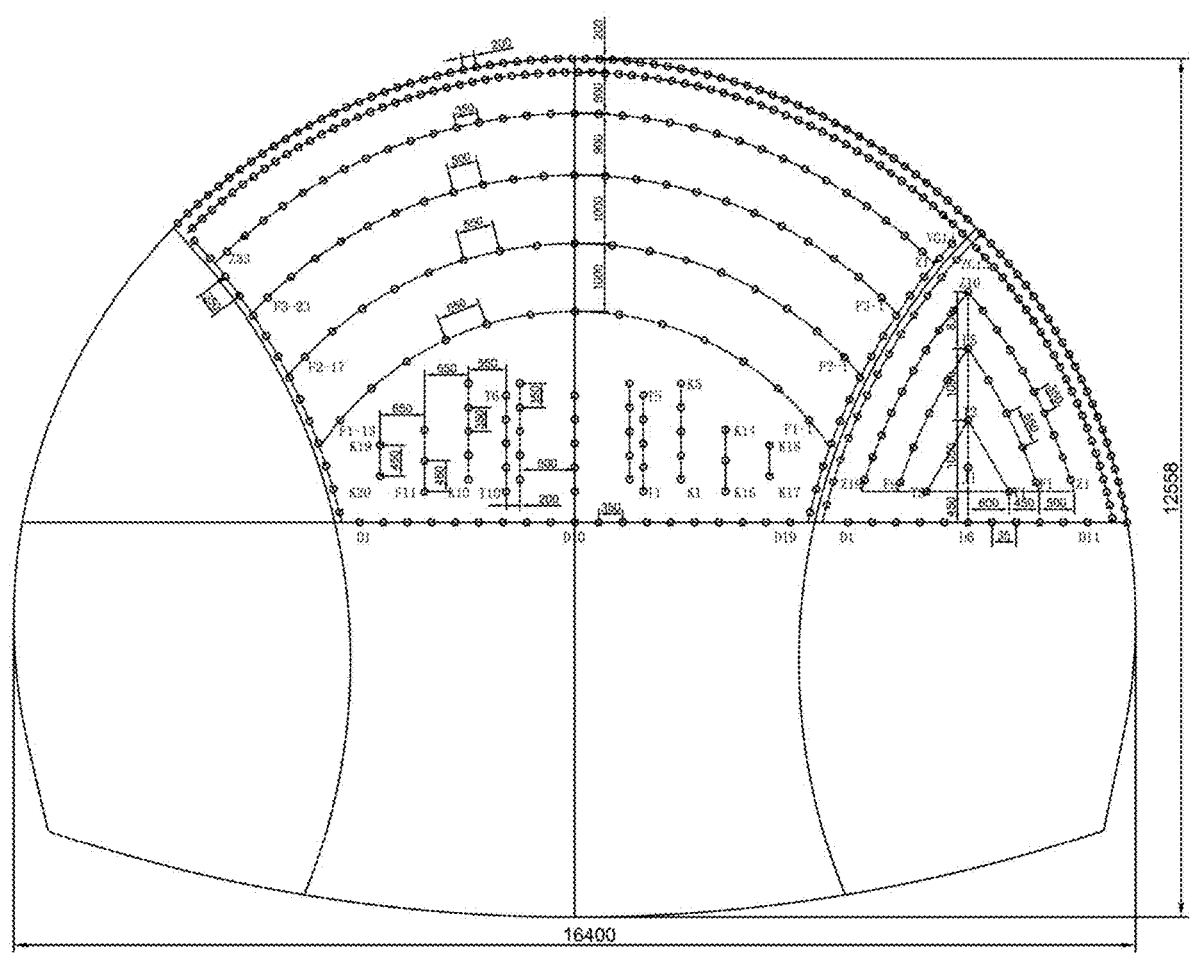
FIG. 5 is a schematic diagram of blast holes and sizes among the blast holes in an upper half section of a tunnel in a use case.

Blasting Design Parameters of the Middle Area in the Upper Half Section of the Tunnel in FIG. 2 and FIG. 5

| Serial number | Hole name | Inclination angle (degrees) | Hole quantity | Depth (m) | separately Charging | Detonator segment number | Stemming length (m) | Detonating sequence | Connection manner |
|---|---|---|---|---|---|---|---|---|---|
| 1 | cutting holes | 80 | 10 | 1.4 | 3/2 rolls at intervals | 1 | 0.5/0.8 | I | parallel connection |
| 2 | cutting vibration reduction holes (left row, middle row and right row) | 80 | 15 | 1.6 | 0 | — | water bag 1.6 | — | |
| 3 | reaming holes | 90 | 20 | 1.4 | 2/1 rolls at intervals | 3 | 0.8/1.1 | II | |
| 4 | first-layer auxiliary holes | 90 | 13 | 1.3 | 1 roll | 4 | 1.0 | III | |
| 5 | second-layer auxiliary holes | 90 | 17 | 1.3 | 1 roll at intervals | 5 | 1.0/1.3 | IV | |
| 6 | third-layer auxiliary holes | 90 | 23 | 1.3 | 1/0.5 rolls at intervals | 6 | 1.0/1.15 | V | |
| 7 | peripheral holes | 90 | 33 | 1.3 | at intervals 0.5 roll | 7 | water stemming of 0.2 m to 0.3 m at the openings of the holes | VI | |
| 8 | bottom holes | 92 | 19 | 1.4 | at intervals 2/1 roll | 8 | 0.8/1.1 | VII | |

Figure 3:
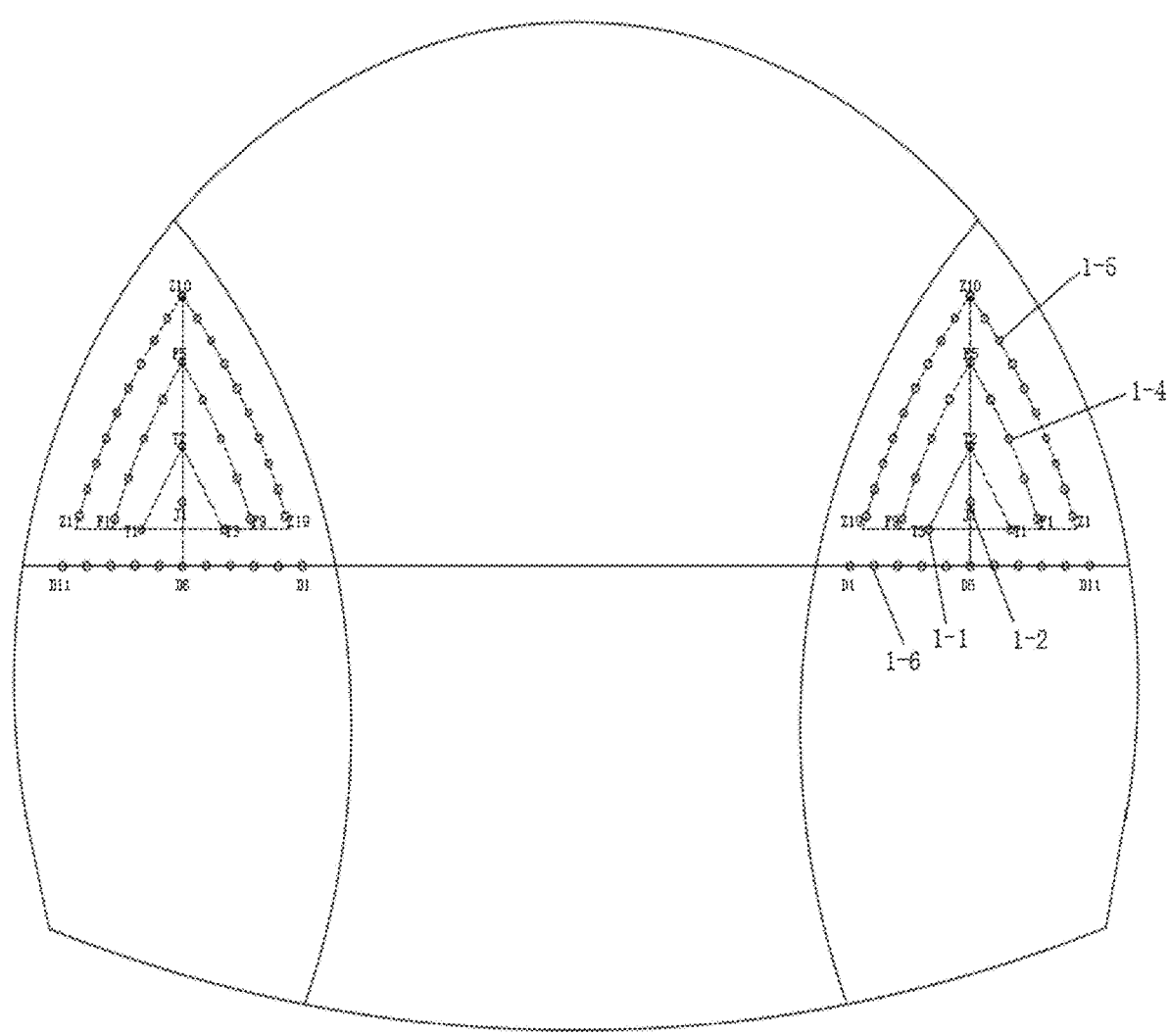
FIG. 3 is a schematic diagram of formation of blast holes of a left heading area and a right heading area of the upper half section of the tunnel in the example 1 in the tunnel section.

The formation manners for the blast holes in the left heading area 12 and the right heading area 13 are illustrated by taking FIG. 3 as an example, since the formation manners for the two areas are the same, the following is to illustrate only by taking the right heading area 13 as an example. As shown in FIG. 3, cutting holes (1-1) and cutting vibration reduction holes 1-2 used in coordination with cutting holes 1-1 are formed in the right heading area 13. Specifically, three cutting holes 1-1 are formed, and the cutting vibration reduction holes 1-2 are formed in connection lines of the three cutting holes 1-1. During charging, the cutting holes 1-1 (T1, T2 and T3 in FIG. 3) are charged with 3 rolls separately; and the cutting vibration reduction holes 1-2 (as shown by J1 in FIG. 3) are not charged and are filled with water bags.

In addition to the cutting holes 1-1 and the cutting vibration reduction holes 1-2, auxiliary holes 1-4, peripheral holes 1-5 and bottom holes 1-6 are further formed in the right heading area 13. Specifically, 3 as an example, the charging quantities of F1 to F9 are 2 rolls, 1 roll, 2 rolls, 1 roll and so on or are 1 roll, 2 rolls, 1 roll, 2 rolls and so on).

The peripheral holes 1-5 (as shown by Z1 to Z19 in FIG. 3) are charged with 0.5 roll separately.

The bottom holes 1-6 (as shown by D1 to D11 in FIG. 3) are charged at intervals in a manner of 2 rolls to 1 roll (charging at intervals in a manner of 2 rolls to 1 roll means that the charging quantity of the bottom holes adjacent to the bottom holes charged with 2 rolls is 1 roll, or in other word, the charging quantity of the bottom holes adjacent to the bottom holes charged with 1 roll is 2 rolls, taking FIG. 3 as an example, the charging quantities of D1 to D11 are 2 rolls, 1 roll, 2 rolls, 1 roll and so on or are 1 roll, 2 rolls, 1 roll, 2 rolls and so on).

TABLE 2

Blasting Design Parameters of the Heading Areas in the Both Sides of the Upper Half Section of the Tunnel in FIG. 3 and FIG. 5

| Serial number | Hole name | Inclination angle (degrees) | Hole quantity | Depth (m) | separately Charging | Charging quantity (Kg) | Detonator segment number | Stemming length (m) | Detonating sequence | Connection manner |
|---|---|---|---|---|---|---|---|---|---|---|
| 1 | cutting holes | 90 | 3 | 1.4 | 3 roll | 2.7 | 1 | 0.5 | I | parallel connection |
| 2 | cutting vibration reduction holes | 90 | 1 | 1.6 | 0 | 0 | — | water bag 1.6 | — | |
| 3 | auxiliary holes | 90 | 9 | 1.3 | 2/1 rolls at intervals | 4.2 | 3 | 0.8/1.1 | II | |
| 4 | peripheral holes | 90 | 19 | 1.3 | 0.5 roll | 2.8 | 5 | coating with water stemming with a length of 0.2 m to 0.3 m at the openings of the holes | III | |
| 5 | bottom holes | 92 | 11 | 1.4 | at intervals 2/1 roll | 4.9 | 8 | 0.8/1.1 | IV | |

The "explosive" in the present application refers to explosive, and in the present application, the explosive is emulsified explosive rolls with a specification of Phi 18 mm*300 mm*300 g.

The connection lines among the blast holes in FIG. 2 to FIG. 4 are not really existing lines, but are drawn for grouping the blast holes during design for the blast holes, and the connection lines are connection lines among the center points of the blast holes, for example, all the vibration isolation holes in the connection lines where the vibration isolation holes indicated by the label 1-7 in FIG. 4 are located are called the first-layer vibration isolation holes 1-7; and it is the same in FIG. 2, for example, the cutting holes in the connection lines where the cutting holes (T1 and T10) indicated by the label 1-1 in FIG. 2 are located are all the cutting holes (T1 to T10) blasted in the middle area 11.

Embodiment 2

As shown in FIG. 1, the embodiment provides a construction method for a rheological soft-weak surrounding rock tunnel, including the following steps:

S1: dividing a tunnel section subjected to grouting reinforcement into two parts, that is, an upper half section 1 and a lower half section 2, and carrying out blasting construction on the upper half section 1 at first; and S2: dividing the upper half section 1 into a middle area 11, a left heading area 12 and a right heading area 13, blasting the left heading area 12 and completing primary support at first, then blasting the middle area 11 and completing primary support, and finally blasting the right heading area 13 and completing primary support. The primary support means supporting in the initial stage, for example, the primary support is carried out according to the following sequence: initial shotcreting, reinforcement mesh installation, steel arch frame erection, anchor rod installation, feet-lock anchor rod installation, and re-shotcreting. The excavation progress of the left heading area 12 is 5 m to 10 m in front of the middle area 11, and the excavation progress of the middle area 11 is 5 m to 10 m in front of the right heading area 13.

S3: After excavation and primary support for the upper half section 1 are completed, excavating the lower half section 2; and also carrying out reinforcement after the excavation is completed (the reinforcement manner is the same as that in step S2).

S4: after each cycle is completed, detaching a steel arch frame in the middle, and carrying out reinforcement construction for a secondary lining.

As a specific implementation solution, in step S1, a conventional grouting reinforcement manner may be adopted for the grouting reinforcement. In the invention, a multi-cycle full-section curtain grouting method adopting a large pipe shed with a diameter of Phi 108 is adopted, for example, an implementation length of first-circle grouting is 25 m, an implementation length of second-circle grouting is 30 m, an implementation length of third-circle grouting is 40 m, and so on; the grouting range is that reinforcement is carried out within 5.0 m to 6.0 m from top to bottom and left to right around the tunnel; the grouting manner is that backward segmented grouting is adopted, a segmenting length of grouting in the holes is determined according to the geological conditions of the drilled holes, and 3 m is preferred; and the grouting sequence is from outside to inside, and from top to bottom.

Referring to the example 1 and FIG. 1 to FIG. 5 for the blast hole formation, i.e. the blasting parameters during blasting, which will not be repeated here.

Use Case

Figure 6:
FIG. 6 is an actual situation diagram of rheological soft-weak surrounding rock in the tunnel in the use case.

During construction for an undersea tunnel, the geologies of construction strata are completely weathered granodiorite (argillaceous medium-coarse sand), brown yellow in color, with gray white spots, and medium-coarse grain structures, most of the construction strata are plastic soil, and in a flowing plastic shape; and some of the construction strata are in a block structure, with hard rocks and well-developed fissure water, the hydrogeology is that a water inflow is 0.7 L/min·m to 2.0 L/min·m, and the construction strata are in a water-rich state and belong to rheological soft-weak surrounding rocks, as shown in FIG. 6.

During construction, the construction method of the embodiments of the invention is adopted, and the arrangement structure of the embodiment 1 is adopted for blast hole formation in the upper half section 1, as shown in FIG. 5. A YT-30 pneumatic rock drill is adopted, and a drill pipe with a specification of Phi 18 mm*1.8 m and an in-line alloy steel drill bit of Phi 42 mm are used for drilling, The blasting parameters are shown in Table 1 and Table 2. The area of an excavation area of the middle area of the upper half section is 57.2 m², the total quantity of the arranged blast holes is 301, the total charging quantity is 41.9 Kg, each blasting footage is 1.2 m, and the unit consumption quantity is 0.61 Kg/m³. After blasting is carried out in a manner of parallel connection, if some empty holes in an arch part are not blasted, a small cantilever tunneling cutter may be used for leveling a side contour line and a top contour line.

The above descriptions are merely preferred embodiments of the present disclosure rather than limitations to the present disclosure in any form. Although the present disclosure has been disclosed in preferred embodiments, it is not intended to limit the invention. Anyone skilled in the art can make some changes or modifications to equivalent embodiments by using the above disclosed technical content without departing from the scope of the technical solution of the present disclosure. Any simple amendments, equivalent changes or modifications made to the above embodiments according to the technical essence of the present disclosure should fall in the scope of the technical solution of the present disclosure, without departing from the content of the technical solution of the present disclosure.

What is claimed is:

1. A blast hole arrangement structure used for blasting for a rheological soft-weak surrounding rock tunnel, wherein a tunnel section subjected to grouting reinforcement is divided into two parts, that is, an upper half section (1) and a lower half section (2), cutting vibration reduction holes (1-2) used in coordination with cutting holes (1-1) are formed in the upper half section (1), and the cutting vibration reduction holes (1-2) are filled with water bags,
wherein a plurality of first-layer vibration isolation holes (1-7) are formed in a tunnel excavation contour line of the upper half section (1), and the first-layer vibration isolation holes (1-7) are filled with soft mud.

2. The blast hole arrangement structure used for blasting for the rheological soft-weak surrounding rock tunnel according to claim 1, wherein a plurality of second-layer vibration isolation holes (1-8) are formed in one side of the first-layer vibration isolation holes (1-7), and the second-layer vibration isolation holes (1-8) are filled with soft mud.

3. The blast hole arrangement structure used for blasting for the rheological soft-weak surrounding rock tunnel according to claim 1, wherein the upper half section (1) is divided into a middle area (11), a left heading area (12) and a right heading area (13) which are used for separate divisional blasting; and the cutting holes (1-1) and the cutting vibration reduction holes (1-2) used in coordination with the cutting holes (1-1) are respectively formed in the middle area (11), the left heading area (12) and the right heading area (13).

4. The blast hole arrangement structure used for blasting for the rheological soft-weak surrounding rock tunnel according to claim 3, wherein a plurality of side vibration isolation holes (1-9) are formed in the junction of the middle area (11) and the left heading area (12) and in the junction of the middle area (11) and the right heading area (13), and the side vibration isolation holes (1-9) are empty holes and are not filled inside.

5. The blast hole arrangement structure used for blasting for the rheological soft-weak surrounding rock tunnel according to claim 3, wherein the middle area (11) is provided with the cutting holes (1-1) vertically in both sides of the center line of the tunnel, and the cutting vibration reduction holes (1-2) are formed vertically in the both sides of the center line of the tunnel and between two rows of the cutting holes (1-1).

6. The blast hole arrangement structure used for blasting for the rheological soft-weak surrounding rock tunnel according to claim 5, wherein
a charging manner for the cutting holes (1-1) in the middle area (11) is that the adjacent cutting holes (1-1) are charged at intervals in a manner of 3 rolls to 2 rolls to the bottoms of the holes, and the remainder of the blast holes are filled with stemming.

7. The blast hole arrangement structure used for blasting for the rheological soft-weak surrounding rock tunnel according to claim 3, wherein the middle area (11) is further provided with reaming holes (1-3), auxiliary holes (1-4), peripheral holes (1-5) and bottom holes (1-6).

8. The blast hole arrangement structure used for blasting for the rheological soft-weak surrounding rock tunnel according to claim 7, wherein
three rows of the reaming holes (1-3) are respectively formed in one side of the center line of the tunnel; and the reaming holes (1-3) are charged at intervals in a manner of 2 rolls to 1 roll.

9. The blast hole arrangement structure used for blasting for the rheological soft-weak surrounding rock tunnel according to claim 7, wherein the auxiliary holes (1-4) are formed between the cutting holes (1-1) and the tunnel excavation contour line of the upper half section (1).

10. The blast hole arrangement structure used for blasting for the rheological soft-weak surrounding rock tunnel according to claim 9, wherein
three layers of the auxiliary holes (1-4) are formed, and respectively are first-layer auxiliary holes (1-41), second-layer auxiliary holes (1-42) and third-layer auxiliary holes (1-43), and on the tunnel section, connection lines among the center points of the auxiliary holes in each layer are arc-shaped.

11. The blast hole arrangement structure used for blasting for the rheological soft-weak surrounding rock tunnel according to claim 10, wherein
the first-layer auxiliary holes (1-41) are charged with 1 roll separately; the second-layer auxiliary holes (1-42) are charged with 1 roll at intervals separately; and the third-layer auxiliary holes (1-43) are charged at intervals in a manner of 1 roll to 0.5 roll.

12. The blast hole arrangement structure used for blasting for the rheological soft-weak surrounding rock tunnel according to claim 7, wherein
the peripheral holes (1-5) are formed between the outermost-layer auxiliary holes (1-4) and the tunnel excavation contour line of the upper half section (1); the peripheral holes (1-5) are charged with 0.5 roll every other hole, and the openings of the charged peripheral holes are sealed with water stemming of 200 mm to 300 mm; and the uncharged peripheral holes (1-5) are fully filled with stemming.

13. The blast hole arrangement structure used for blasting for the rheological soft-weak surrounding rock tunnel according to claim 7, wherein
the bottom holes (1-6) are formed in the junction of the middle area (11) and the lower half section (2), and the bottom holes (1-6) are charged at intervals in a manner of 2 rolls to 1 roll.

14. The blast hole arrangement structure used for blasting for the rheological soft-weak surrounding rock tunnel according to claim 3, wherein the cutting holes (1-1) and the cutting vibration reduction holes (1-2) used in coordination with the cutting holes (1-1) are respectively formed in the left heading area (12) and the right heading area (13).

15. The blast hole arrangement structure used for blasting for the rheological soft-weak surrounding rock tunnel according to claim 14, wherein three cutting holes (1-1) are respectively formed in the left heading area (12) and the right heading area (13), and the cutting vibration reduction holes 1-2 are formed in connection lines of the three cutting holes 1-1; and during charging, the cutting holes (1-1) are charged with 3 rolls separately, and the cutting vibration reduction holes (1-2) are not charged and are filled with water bags.

16. The blast hole arrangement structure used for blasting for the rheological soft-weak surrounding rock tunnel according to claim 14, wherein auxiliary holes (1-4), peripheral holes (1-5) and bottom holes (1-6) are respectively formed in the left heading area (12) and the right heading area (13).

* * * * *